(12) United States Patent
Nagashima et al.

(10) Patent No.: US 10,690,497 B2
(45) Date of Patent: Jun. 23, 2020

(54) SURVEYING INSTRUMENT INCLUDING A REFLECTIVE PRISM MOUNTED ON A MOVABLE PART

(71) Applicant: KABUSHIKI KAISHA TOPCON, Itabashi-ku (JP)

(72) Inventors: Terukazu Nagashima, Itabashi-ku (JP); Shin-ichi Hayase, Itabashi-ku (JP); Atsushi Shoji, Itabashi-ku (JP)

(73) Assignee: KABUSHIKI KAISHA TOPCON, Tokyo (JP)

( * ) Notice: Subject to any disclaimer, the term of this patent is extended or adjusted under 35 U.S.C. 154(b) by 0 days.

(21) Appl. No.: 14/982,334

(22) Filed: Dec. 29, 2015

(65) Prior Publication Data
US 2016/0202058 A1    Jul. 14, 2016

(30) Foreign Application Priority Data

Jan. 13, 2015  (JP) .................................. 2015-004049

(51) Int. Cl.
*G01C 15/00*    (2006.01)
*B25J 9/02*    (2006.01)
*G01C 15/08*    (2006.01)

(52) U.S. Cl.
CPC ............ *G01C 15/004* (2013.01); *B25J 9/023* (2013.01); *G01C 15/08* (2013.01)

(58) Field of Classification Search
CPC ........... B25J 9/023; B25J 9/026; B23Q 1/621; G01C 15/06; G01C 15/08; G01C 15/004; Y10S 248/913; Y10T 74/20354

USPC ....... 248/913, 187.1; 33/290, 291, 286, 293; 74/490.09; 310/12.05–12.06; 108/143; 702/150, 151; 73/1.75
See application file for complete search history.

(56) References Cited

U.S. PATENT DOCUMENTS

| 3,475,973 A | * | 11/1969 | Blazek | ..................... B23Q 1/25 74/29 |
| 3,986,007 A | * | 10/1976 | Ruoff, Jr. | ................. B25J 15/08 700/251 |
| 4,841,460 A | * | 6/1989 | Dewar | ................. G01B 11/002 356/615 |

(Continued)

FOREIGN PATENT DOCUMENTS

| CA | 2708576 A1 * | 1/2012 | ............. G01C 15/06 |
| JP | 62-88526 A | 4/1987 | |

(Continued)

OTHER PUBLICATIONS

Machine translation of CA2708576A1.*

(Continued)

*Primary Examiner* — Randy W Gibson
*Assistant Examiner* — David L Singer
(74) *Attorney, Agent, or Firm* — Xsensus LLP (57) ABSTRACT

A technique for more smoothly moving a reflective prism to a target position is provided. A surveying instrument 100 includes a leg part 101, a base 102 supported by the leg part 101, a movable part 112 held by the base 102 and being movable straight in any direction within a two-dimensional plane relative to the base 102, a reflective prism 113 mounted on the movable part 112, and a laser pointer 114 that is mounted to the movable part 112 and that emits a guiding light in a vertical direction.

4 Claims, 7 Drawing Sheets

(56) References Cited

U.S. PATENT DOCUMENTS

| | | | | |
|---|---|---|---|---|
| 5,214,976 | A * | 6/1993 | Yanagisawa | B23Q 1/621 408/46 |
| 5,253,833 | A * | 10/1993 | Indou | F16M 11/36 248/168 |
| 5,311,791 | A | 5/1994 | Yanagisawa | |
| 5,440,112 | A * | 8/1995 | Sakimura | G01C 15/002 250/203.1 |
| 5,477,459 | A * | 12/1995 | Clegg | G01C 15/002 356/152.1 |
| 5,749,549 | A * | 5/1998 | Ashjaee | F16M 11/14 248/168 |
| 5,804,932 | A * | 9/1998 | Yanagisawa | B25J 9/023 108/143 |
| 6,631,877 | B1 * | 10/2003 | Crain | G01C 15/00 248/168 |
| 7,611,105 | B1 * | 11/2009 | Carazo | G01C 15/06 248/186.2 |
| 8,532,950 | B2 * | 9/2013 | Steckhan | G06T 7/33 359/368 |
| 2003/0202166 | A1 * | 10/2003 | Takeishi | G03F 7/70716 355/72 |
| 2004/0135990 | A1 * | 7/2004 | Ohtomo | G01C 15/002 356/4.01 |
| 2007/0044333 | A1 * | 3/2007 | Qi | G01C 15/002 33/291 |
| 2009/0231582 | A1 * | 9/2009 | Aebischer | G01C 15/002 356/364 |
| 2012/0010847 | A1 | 1/2012 | Hamel et al. | |
| 2015/0260506 | A1 * | 9/2015 | Bridges | G01B 21/045 356/3.09 |
| 2015/0268043 | A1 * | 9/2015 | McFadden | G01C 11/04 702/159 |

FOREIGN PATENT DOCUMENTS

| | | |
|---|---|---|
| JP | 63-237831 A | 10/1988 |
| JP | 2004-317406 A | 11/2004 |
| JP | 2005-233921 A | 9/2005 |
| JP | 2006-102880 A | 4/2006 |

OTHER PUBLICATIONS

Collins, The Foundations of Celestial Mechanics, Chapter 2: Coordinate Systems and Coordinate Transformations (Year: 2004).*
Horn, Closed-form solution of absolute orientation using unit quaternions, Reprinted from Journal of the Optical Society of America A, vol. 4, p. 629, Apr. 1987 (Year: 1987).*
Widnall, Lecture L3—Vectors, Matrices and Coordinate Transformations, MIT Dynamics Fall 2009 (Year: 2009).*
Extended European Search Report dated Jun. 6, 2016 in Patent Application No. 16000061.8.
Office Action dated Aug. 11, 2017 in European Patent Application No. 16 000 061.8.
Japanese Office Action dated Oct. 3, 2018, issued in Japanese Application No. 2015-004049, including its machine-translation in English.

* cited by examiner

SURVEYING INSTRUMENT INCLUDING A REFLECTIVE PRISM MOUNTED ON A MOVABLE PART

BACKGROUND OF THE INVENTION

Technical Field

The present invention relates to a technique used in construction work, civil engineering work, and the like.

Background Art

For example, at a construction site, work of marking plural reference positions is conducted based on a construction drawing. The marking work is conducted not only at the construction site, but also at a civil engineering worksite. These reference positions are called "survey setting points". Various kinds of construction works are conducted using the survey setting points as references. For example, in a case of interior finishing work in a building, locations of wall materials, locations of electric wiring, locations of air conditioners, locations of various types of piping, etc. are determined using plural survey setting points marked on a floor surface as references.

Meanwhile, the marking work for the survey setting points is performed by measurement using a total station. In this process, measuring light from the total station is received by a dedicated reflective prism, and the location of the mark is identified. For example, a mark or the like is placed at a survey setting point in the case of a construction site, and a pile is driven at a survey setting point in the case of a civil engineering worksite.

In the process of identifying the location of a survey setting point, a worker walks holding a reflective prism in the hands while watching the survey setting point in a guide display indicated on a terminal display. Then, the worker temporarily places the reflective prism at the location displayed on the terminal display and receives the measuring light from the total station at the reflective prism. The total station detects the measuring light reflected by the reflective prism and performs calculations such as of margin of error, whereby a precise location of the survey setting point is calculated. This information is displayed on the terminal of the worker, and then the worker finely adjusts the location of the reflective prism. The location of the survey setting point is identified by alternately repeating these steps, and it is then marked.

In the step of finely adjusting the location of the prism, the reflective prism must be finely moved with a precision of not more than a centimeter in a condition in which the reflective prism attached with a rod-shaped pin is vertically erected. At this time, if the reflective prism tilts, the precision of the survey is decreased, and the margin of error is increased. As a technique for solving this problem, a technique disclosed in U.S. Unexamined Patent Application Publication No. 2012/0010847 is publicly known.

According to the technique disclosed in U.S. Unexamined Patent Application Publication No. 2012/0010847, a reflective prism is arranged on an X-Y stage, which can finely move in the X-axis direction and in the Y-axis direction that orthogonally cross each other, and it thereby can be finely moved in the X-axis direction and in the Y-axis direction without tilting.

However, in the technique disclosed in U.S. Unexamined Patent Application Publication No. 2012/0010847, the movable direction is limited to the two axis directions that orthogonally cross each other. Therefore, the reflective prism can be moved straight to a target position as long as the target position is on the X-axis or the Y-axis of the X-Y stage. Otherwise, the reflective prism must be moved on the X-axis of the X-Y stage and then be further moved on the Y-axis. Such a step is complicated and tends to increase the margin of error.

SUMMARY OF THE INVENTION

In view of these circumstances, it is an object of the present invention to provide a technique for more smoothly moving a reflective prism to a target position.

A first aspect of the present invention provides a surveying instrument including a leg part, a base supported by the leg part, a movable part which is held by the base and is movable straight in any direction within a two-dimensional plane relative to the base, a reflective prism mounted on the movable part, and a guiding light emitting part that is mounted to the movable part and that emits guiding light in a vertical direction.

According to a second aspect of the present invention, in the first aspect of the present invention, the leg part may be a tripod, and two legs of the tripod may be extendable.

According to a third aspect of the present invention, in the first or the second aspect of the present invention, the base may be arranged with a first guide and a second guide, which are movable independently of each other relative to the base and cross each other. In this case, the movable part may engage with the first guide and the second guide at a portion, at which the first guide and the second guide cross each other, so as to be simultaneously movable relative to the first guide and the second guide.

According to a fourth aspect of the present invention, in the third aspect of the present invention, the first guide may be mounted on the base in a condition in which the first guide is movable in a first direction, and the second guide may be mounted on the base in a condition in which the second guide is movable in a second direction which orthogonally crosses the first direction.

According to a fifth aspect of the present invention, in the third aspect of the present invention, the first guide may be pivotably mounted at a first portion of the base, and the second guide may be pivotably mounted at a second portion of the base, which is different from the first portion.

According to a sixth aspect of the present invention, in the fourth or the fifth aspect of the present invention, the surveying instrument may also include a first driving source configured to move the first guide relative to the base, a second driving source configured to move the second guide relative to the base, and a controlling part configured to control movements of the first driving source and the second driving source.

According to a seventh aspect of the present invention, in the sixth aspect of the present invention, the controlling part may control movement of the movable part based on data relating to positional change of the movable part when the first driving source is driven and based on data relating to positional change of the movable part when the second driving source is driven.

According to the present invention, a technique for more smoothly guiding the reflective prism to a target survey setting point, regardless of the skill of a worker, is obtained.

PREFERRED EMBODIMENTS OF THE INVENTION

1. First Embodiment

Structure

Figure 1:
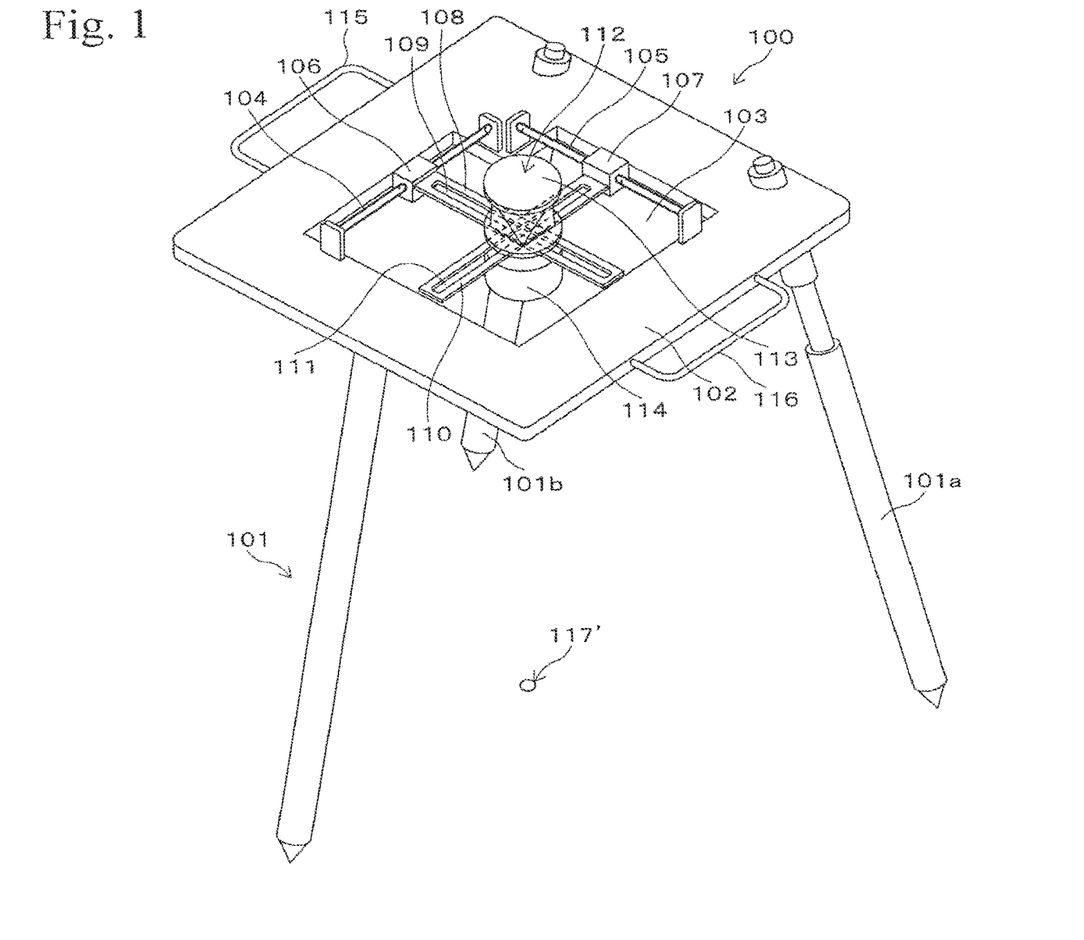
FIG. 1 is a perspective view of an embodiment.

FIG. 1 shows a survey setting accessory 100 as an embodiment. The survey setting accessory 100 is a surveying instrument that can be used for survey work. The survey setting accessory 100 includes a leg part 101 with three legs and includes a base 102 that is supported by the leg part 101. The survey setting accessory 100 is configured to be set on a surface 120, which is a survey setting target, by the leg part 101 (refer to FIG. 2B). The surface, which is a survey setting target, may include a floor surface in a building, a road surface at a civil engineering worksite, or the like.

In the leg part 101, two of the three legs are extendible legs 101a and 101b. The lengths of the extendible legs 101a and 101b can be fixed in a condition in which the extendible legs 101a and 101b are extended. FIG. 1 shows a condition in which the extendible leg 101 a is extended by a small amount, and FIG. 2B shows a condition in which the extendible leg 101a is contracted. The leg part 101 supports the base 102. The base 102 is made of a thin sheet-shaped member and has a rectangular frame shape. The base 102 is mounted with handles 115 and 116. The survey setting accessory 100 can be moved by holding the handles 115 and 116 with the hands.

The base 102 with the frame shape includes an approximately rectangular opening 103 provided at the center thereof. Straight-shaped rails 104 and 105 are arranged on the base 102. The rail 104 is arranged along one of inside edges of the opening 103 at a position in the vicinity of the edge so as to cross over the opening 103. The rail 105 extends in a direction orthogonally crossing the rail 104 and is also arranged along one of the inside edges of the opening 103 at a position in the vicinity of the edge so as to cross over the opening 103.

A slider 106 is engaged with the rail 104 in a movable state in the extending direction of the rail 104. In this embodiment, the rail 104 is a round bar, and the slider 106 is provided with a hole, through which the rail 104 penetrates in a slidable state relative to the slider 106. The rail 105 is engaged with a slider 107, in which the engaging structure is the same as that of the rail 104 and the slider 106, and the slider 107 is movable along the rail 105.

The slider 106 has a plate 108, which is fixed thereto and extends in a direction orthogonally crossing the rail 104. The plate 108 is an example of the first guide and is provided with a slit-shaped long hole 109 that extends in the longitudinal direction thereof. The slider 107 has a plate 110, which is fixed thereto and extends in a direction orthogonally crossing the rail 105. The plate 110 is an example of the second guide and is provided with a long hole 111 that extends in the longitudinal direction thereof.

The rail 104 is parallel to the plate 110, whereas the rail 105 is parallel to the plate 108. The plates 108 and 110 cross each other and have a movable part 112 arranged at the crossing portions. The movable part 112 has a shaft part 112a (refer to FIG. 2A), which is loosely fitted to the long holes 109 and 111, and is slidably movable in the longitudinal direction of the plate 108 and in the longitudinal direction of the plate 110.

In addition, the movable part 112 is engaged with the plates 108 and 110 via a gimbal mechanism, whereby the shaft of the movable part 112 is maintained in the vertical direction even when the base 102 tilts. The movable part 112 has a reflective prism 113 arranged on the top thereof and has a laser pointer 114 arranged on the bottom thereof. The reflective prism 113 reflects searching light and measuring light from a total station 200 in the range of 360 degrees in a horizontal plane. The laser pointer 114 emits guiding laser light (for example, red laser light) in the vertical downward direction. FIG. 2B shows a light axis 117 of the guiding light emitted from the laser pointer 114, and FIG. 1 shows a bright point 117' at the position irradiated with the guiding light.

The movable part 112 is movable in any direction within a two-dimensional plane that is limited by the rails 104 and 105. For example, when the movable part 112 is moved along the longitudinal direction of the plate 108, the movable part 112 slides relative to the long hole 109 and moves along the longitudinal direction of the long hole 109. At this time, the slider 107 slides along the extending direction of the rail 105 (movement in a first direction). On the other hand, when the movable part 112 is moved along the longitudinal direction of the plate 110, the movable part 112 slides relative to the long hole 111 and moves along the longitudinal direction of the long hole 111. At this time, the slider 106 slides along the extending direction of the rail 104 (movement in a second direction).

The movements of the movable part 112 in the first direction and in the second direction can be performed in sequence and can also be performed simultaneously. As a result, the movable part 112 can be moved in any direction within the two-dimensional plane that is limited by the rails 104 and 105.

Example of Working Procedure for Marking Survey Setting Point

Here, an example of working procedure for marking a survey setting point located on a floor surface of a building will be described. A total station 200 is set at a worksite, and a terminal 201 and a survey setting accessory 100 are prepared, when starting the marking work. The set location of the total station is predetermined, and coordinates of the set location are preliminarily obtained. In other cases, temporal coordinates may be defined depending on conditions of the worksite. The terminal 201 may be a portable information processing terminal, which can be used by a general operating system and which is equipped with a communication function such as a wireless LAN, a display, and an operation input part such as a touch panel. The reflective prism 113 is positioned at an approximately center of a movable plane (in the vicinity of the center of the opening 103).

First, coordinate data of a target survey setting point is transmitted from the terminal of the worker to the total station. This communication may be performed through a wireless LAN, for example. The location of the survey setting point is displayed on the display of the terminal of the worker by using the location of the total station as a reference, and the total station automatically rotates in the direction of the coordinate data transmitted. For example, a simple map for visually recognizing the location of the survey setting point is displayed on the display of the terminal, and the worker moves the survey setting accessory 100 with the hands while referring to the simple map on the display. The total station emits a searching light for acquiring the reflective prism, and when the survey setting accessory 100 comes close to the survey setting point, the reflective prism 113 of the survey setting accessory 100 is acquired by the total station, and a distance measuring laser light is reflected by the reflective prism 113, whereby the location of the reflective prism 113 is measured by the total station. At this time, the movable part 112 is prevented from tilting by the gimbal mechanism provided thereto.

The location data of the reflective prism 113 measured by the total station is transmitted to the terminal. When the terminal receives this location data, both the location of the survey setting point and the location of the reflective prism 113 measured by the total station are displayed on the display of the terminal. The worker moves the survey setting accessory 100 so that the measured location of the reflective prism 113 on the display of the terminal comes close to the survey setting point, referring to these locations on the display.

The worker repeats a set of the measurement of the location of the reflective prism and then the movement of the survey setting accessory toward the survey setting point, until the survey setting point comes into a movable range of the reflective prism 113 of the survey setting accessory 100. The total station preliminarily obtains data relating to the movable range of the reflective prism 113 of the survey setting accessory 100, and it transmits a notification signal to the terminal based on this data when the survey setting point comes into the movable range of the reflective prism 113. The terminal informs the worker of receiving the notification signal by a notification sound, or by highlighting such as by blinking the display or the like, when it receives the notification signal.

When the worker is informed of the above notification, the worker secures the survey setting accessory 100 at that location. At this time, the base 102 is made level by adjusting the lengths of the extendible legs 101a and 101b. A level (not shown) is arranged at the base 102, and the worker secures the levelness of the base 102 by using the level.

After the survey setting accessory 100 is secured, the movable part 112 is moved by hand so that the measured location of the reflective prism 113 coincides with the survey setting point on the display of the terminal. At this time, since the movable part 112 is movable in any direction within a plane, the position matching is easily performed.

When the measured location of the reflective prism 113 coincides with the survey setting point on the display, the bright point (irradiating point) of the laser pointer 114 is marked as a survey setting point. This marking may be performed by painting the point or by attaching a seal on the point, for example.

Advantages

When the movable part 112 is moved relative to the base 102 by holding it by hand or by pushing it by hand, the movable part 112 can be moved in any direction. That is, the movable part 112 can be moved straight to a target position. In this case, it is not necessary to perform the operation of moving the movable part 112 in the first direction and then moving it in the second direction to a target position or the operation of moving the movable part 112 in the first direction and simultaneously moving it in the second direction to a target position. Therefore, the work for marking the survey setting point is further simplified, whereby the efficiency of the work for marking the survey setting point is improved.

Modifications

Figure 2A:
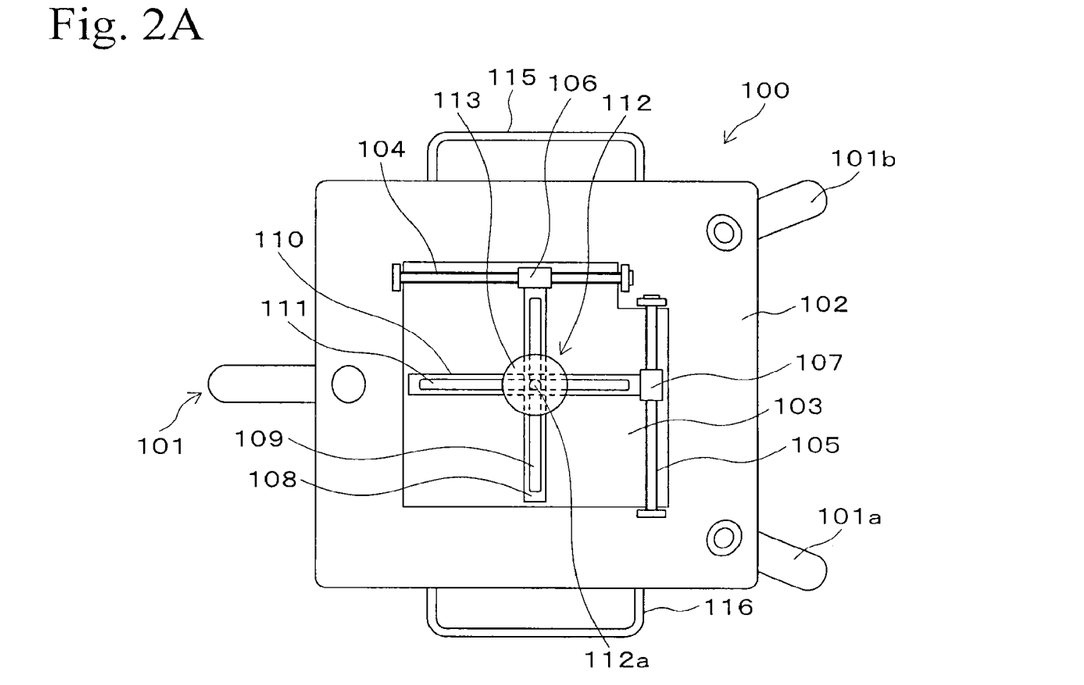
FIG. 2A is a top view of an embodiment.
Figure 2B:
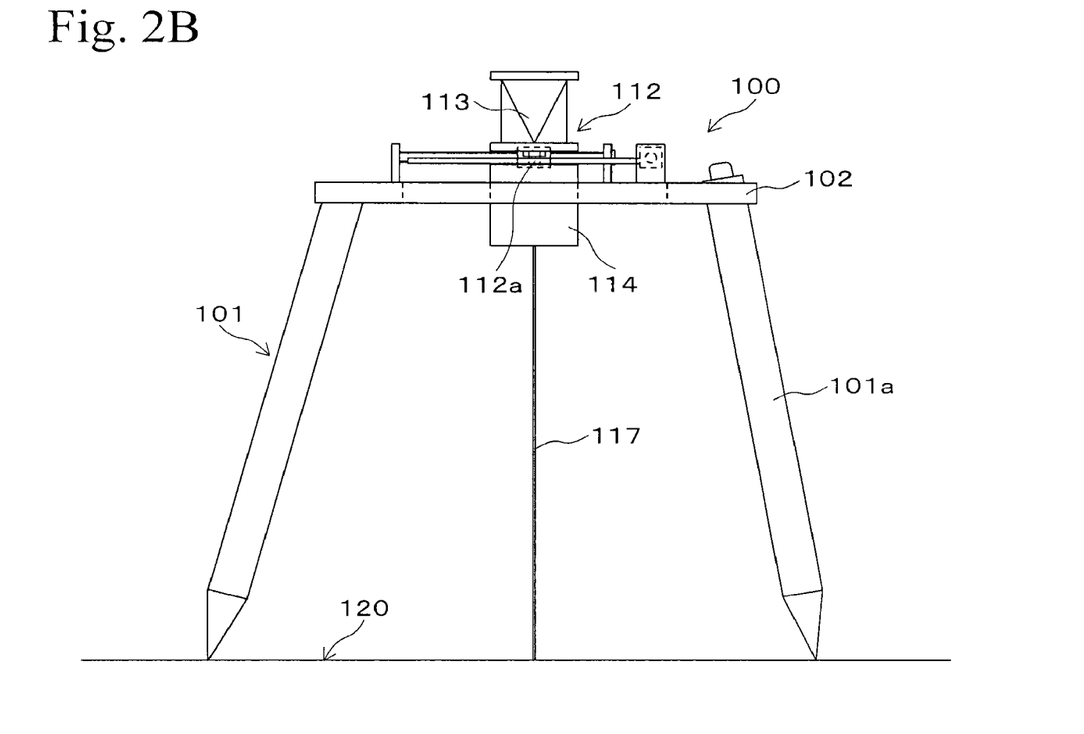
FIG. 2B is a side view thereof.
Figure 3:
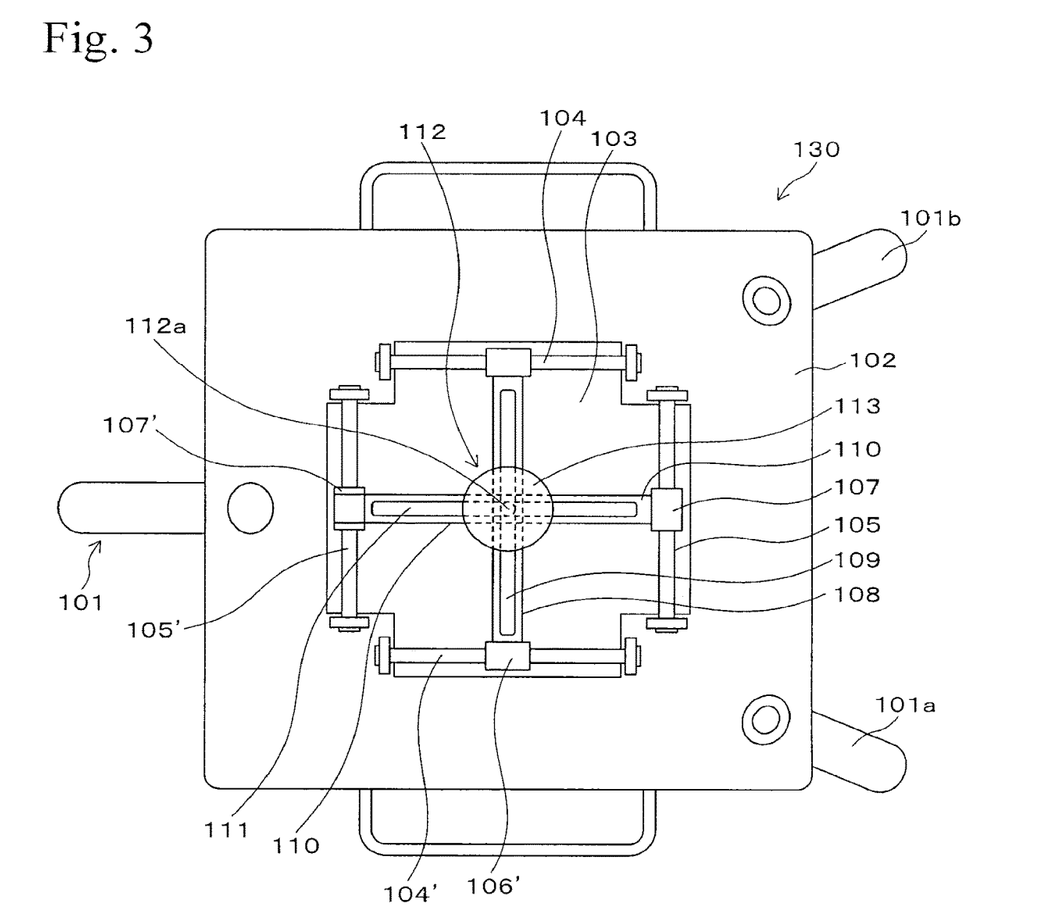
FIG. 3 is a top view of an embodiment.

FIG. 3 shows a modified example of the structure shown in FIGS. 1, 2A, and 2B. FIG. 3 shows a survey setting accessory 130, in which a rail 104' is arranged as one of a pair of the rail 104 with the opening 103 therebetween and a rail 105' is arranged as one of a pair of the rail 105 with the opening 103 therebetween in the structure shown in FIGS. 1, 2A, and 2B. A slider 106' is slidably engaged with the rail 104', and an end of the plate 108 is fixed to the slider 106'. Similarly, a slider 107' is slidably engaged with the rail 105', and an end of the plate 110 is fixed to the slider 107'.

The manner of movement in the structure shown in FIG. 3 is the same as in the structure shown in FIGS. 1, 2A, and 2B. In this structure, both ends of the plates 108 and 110 in the longitudinal direction are held by the sliders so as to be slidable relative to the rails, whereby the movable part 112 can be more smoothly moved.

Figure 4A:
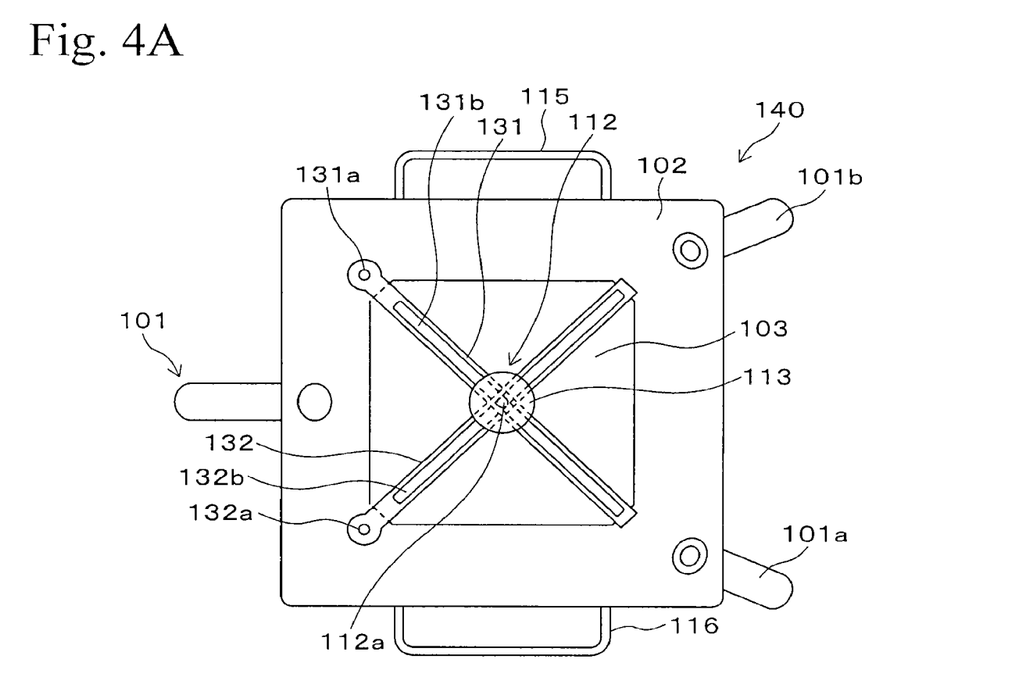
FIG. 4A is a top view of an embodiment.
Figure 4B:
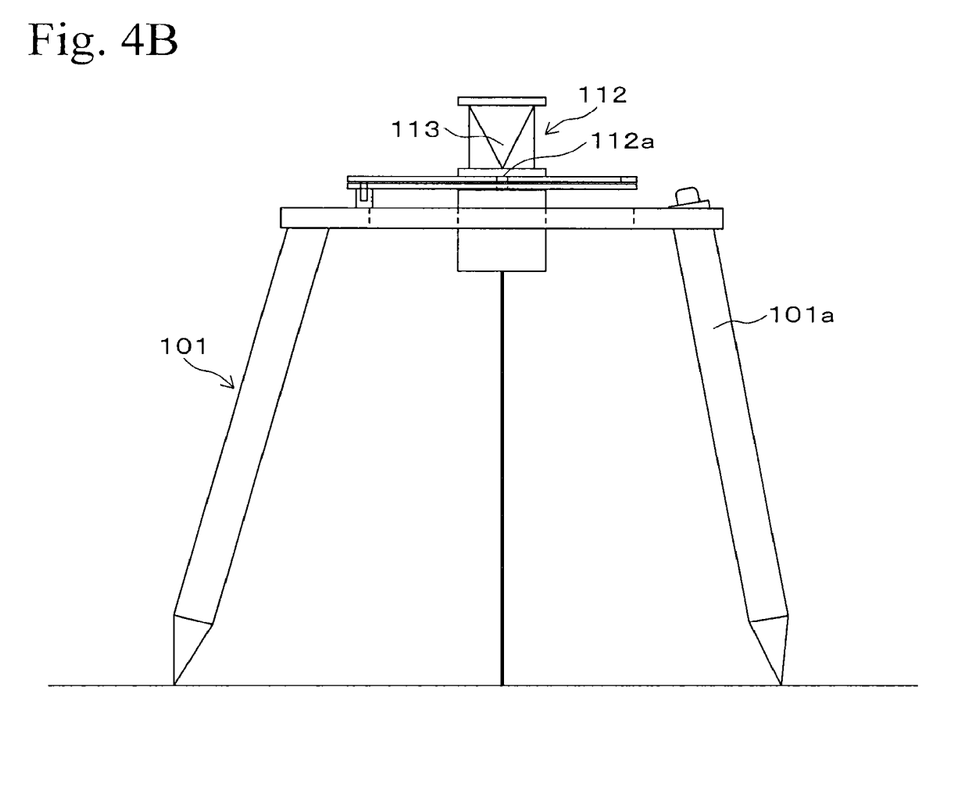
FIG. 4B is a side view thereof.

FIGS. 4A and 4B show another modified example. FIGS. 4A and 4B show a survey setting accessory 140, of which the movable part 112 has a moving mechanism different from that in the case shown in FIG. 1 or 3. The survey setting accessory 140 has a base 102 that is mounted with pivotable arms 131 and 132. The arm 131 is an example of the first guide, and the arm 132 is an example of the second guide. The arm 131 is pivotable around a shaft 131a in such a way as to swing the arm. Similarly, the arm 132 is pivotable around a shaft 132a in such a way as to swing the arm.

The shafts 131a and 132a are respectively provided at a position close to each of both ends on an inner side of an approximately rectangular-shaped opening 103 of the base 102. The arm 131 is provided with a slit-shaped long hole 131b, and the arm 132 is provided with a slit-shaped long hole 132b. The arms 131 and 132 cross each other at a portion, at which the movable part 112 is arranged. In the structure shown in FIGS. 4A and 4B, the movable part 112 has a shaft part 112a, which is loosely fitted in the long holes 131b and 132b, and it is slidably movable in the longitudinal direction of the arm 131 and in the longitudinal direction of the arm 132.

By holding the movable part 112 with the hand, the movable part 112 can be moved in any direction within a two-dimensional plane of the base 102 from the condition shown in FIG. 4A. For example, when the movable part 112 is moved in the leftward direction in FIG. 4A from the condition shown in FIG. 4A, the movable part 112 slides relative to the arms 131 and 132, and the arm 131 pivots in the clockwise direction, whereas the arm 132 pivots in the counter clockwise direction so as to enable the movable part 112 to slide. By combining the sliding of the movable part 112 along the arms 131 and 132 and the pivot movements of the arms 131 and 132 for enabling the sliding of the movable part 112, the movable part 112 can be moved to any position within the opening 102. The usage of the survey setting accessory 130 or 140 is the same as that of the survey setting accessory 100 shown in FIG. 1.

2. Second Embodiment

Figure 5:
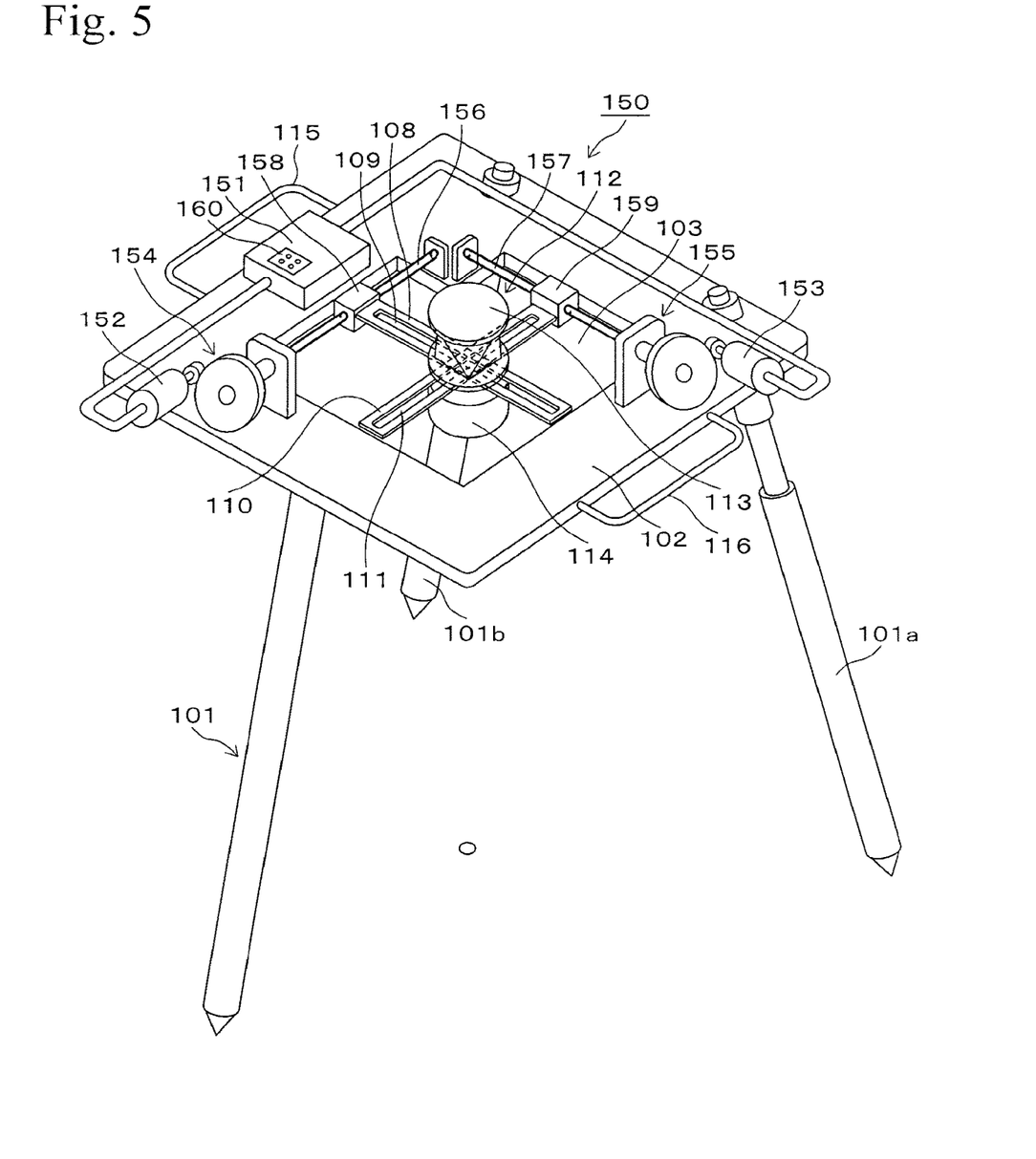
FIG. 5 is a perspective view of an embodiment.
Figure 6A:
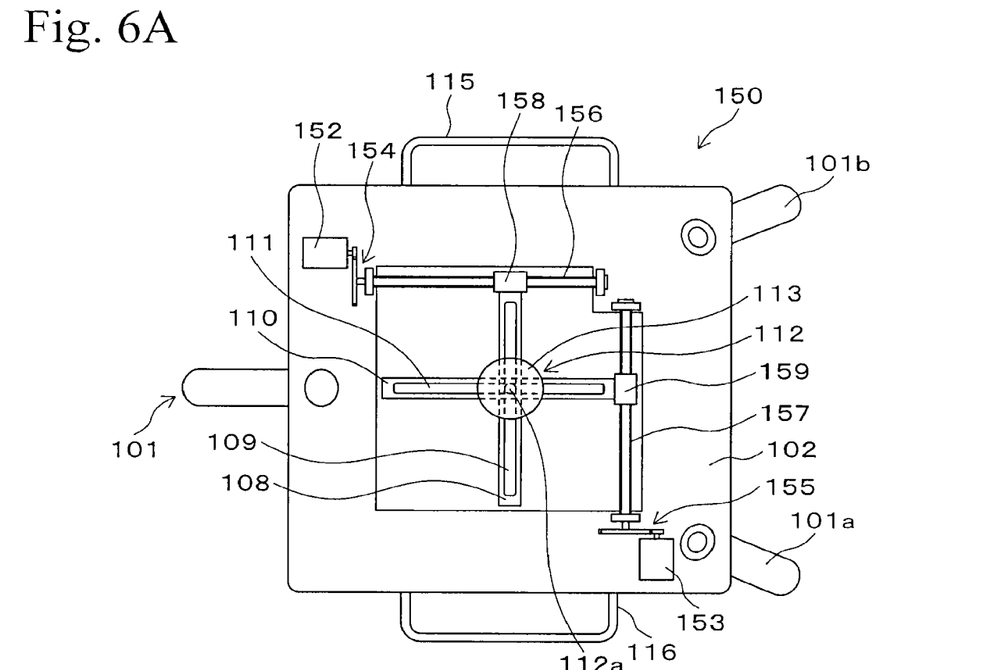
FIG. 6A is a top view of an embodiment.
Figure 6B:
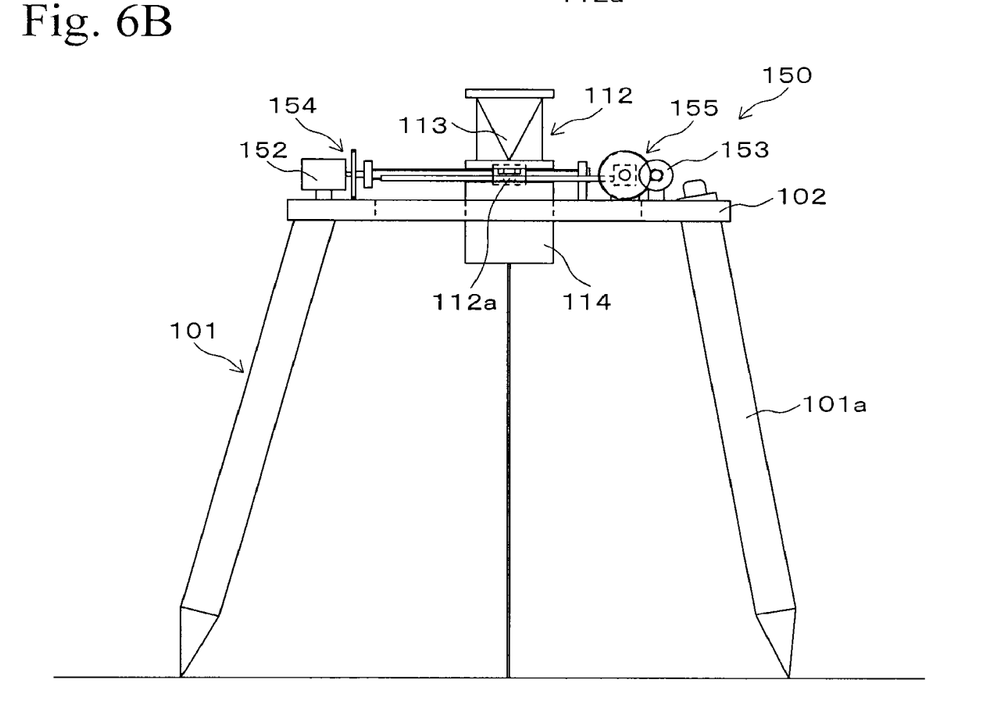
FIG. 6B is a side view thereof.

In this embodiment, the movable part 112 of the survey setting accessory 100 shown in FIGS. 1, 2A and 2B is modified so as to be electrically driven. FIG. 5 is a perspective view of this embodiment, FIG. 6A is a top view thereof, and FIG. 6B is a side view thereof. FIGS. 5, 6A, and 6B show a survey setting accessory 150, in which the movable part 112 is configured to be driven by motors within the two-dimensional plane inside the opening 103 and to be electrically moved to the location of a survey setting point. It should be noted that the parts indicated by the same symbols as in FIGS. 1, 2A, and 2B are the same parts as described relating to the First Embodiment.

The survey setting accessory 150 includes a base 102, on which a controlling part 151, a motor 152, a motor 153, a gear part 154, and a gear part 155 are arranged. The controlling part 151 controls rotations of the motors 152 and 153. It should be noted that the controlling part 151 is not shown in FIGS. 6A and 6B. The gear part 154 transmits the driving force of the motor 152 to a screw rod 156. The screw rod 156 is arranged at the position of the rail 104 shown in FIG. 1 and is a rod-shaped long screw with a male thread at the outer circumference thereof. The screw rod 156 is held by the base 102 in a rotatable state and is driven by the motor 152 so as to rotate. The gear part 155 transmits the driving force of the motor 153 to a screw rod 157. The screw rod 157 is arranged at the position of the rail 105 shown in FIG. 1 and is a rod-shaped long screw with a male thread on the outer circumference thereof. The screw rod 157 is held by the base 102 in a rotatable state and is driven by the motor 153 so as to rotate.

A slider 158 is engaged with the screw rod 156, and it has a female screw portion, through which the screw rod 156 penetrates in a threadedly engaged state. When the screw rod 156 rotates, the slider 158 moves along the longitudinal direction of the screw rod 156 due to the screwing function. That is, when the motor 152 is rotated, the screw rod 156 rotates, whereby the slider 158 moves along the longitudinal direction of the screw rod 156. Similarly, a slider 159 is engaged with the screw rod 157, and it has a female screw portion, through which the screw rod 157 penetrates in a threadedly engaged state. When the screw rod 157 rotates, the slider 159 moves along the longitudinal direction of the screw rod 157 due to screwing action. That is, when the motor 153 is rotated, the screw rod 157 rotates, whereby the slider 159 moves along the longitudinal direction of the screw rod 157.

As in the case shown in FIG. 1, a plate 108 having a long hole 109 is fixed to slider 158, and a plate 110 having a long hole 111 is fixed to slider 159. The plate 108 extends in a direction orthogonal to the screw rod 156, and the plate 110 extends in a direction orthogonal to the screw rod 157. In addition, the plates 108 and 110 orthogonally cross each other in the extending direction (longitudinal direction). The movable part 112 includes a shaft part 112a as in the case of the structure shown in FIGS. 2A and 29. The shaft part 112a penetrates through the long holes 109 and 110 in a loosely fitted state. This structure is the same as the structure shown in FIG. 1, and the movable part 112 is slidable along the longitudinal directions of the plates 108 and 110 while engaged with the long holes 109 and 110.

For example, when the motor 152 is rotated, the screw rod 156 rotates, whereby the slider 158 moves along the longitudinal direction of the screw rod 156. The movable part 112 moves in the same direction as the slider 158 in accordance with the movement of the slider 158. Meanwhile, the shaft part 112a of the movable part 112 slides within the long hole 111, thereby enabling the movement of the movable part 112. On the other hand, when the motor 153 is rotated, the screw rod 157 rotates, whereby the slider 159 moves along the longitudinal direction of the screw rod 157. The movable part 112 moves in the same direction as the slider 159 in accordance with the movement of the slider 159. Meanwhile, the shaft part 112a (refer to FIGS. 2A and 2B) of the movable part 112 slides within the long hole 109, thereby enabling the movement of the movable part 112.

The movement of the movable part 112 driven by the motor 152 and the movement of the movable part 112 driven by the motor 153 orthogonally cross each other. When the motors 152 and 153 are simultaneously rotated, the movements of the movable part 112 in the two directions that orthogonally cross each other simultaneously occur, whereby the movable part 112 can be moved in any direction in the two-dimensional plane within the opening 103.

Figure 7:
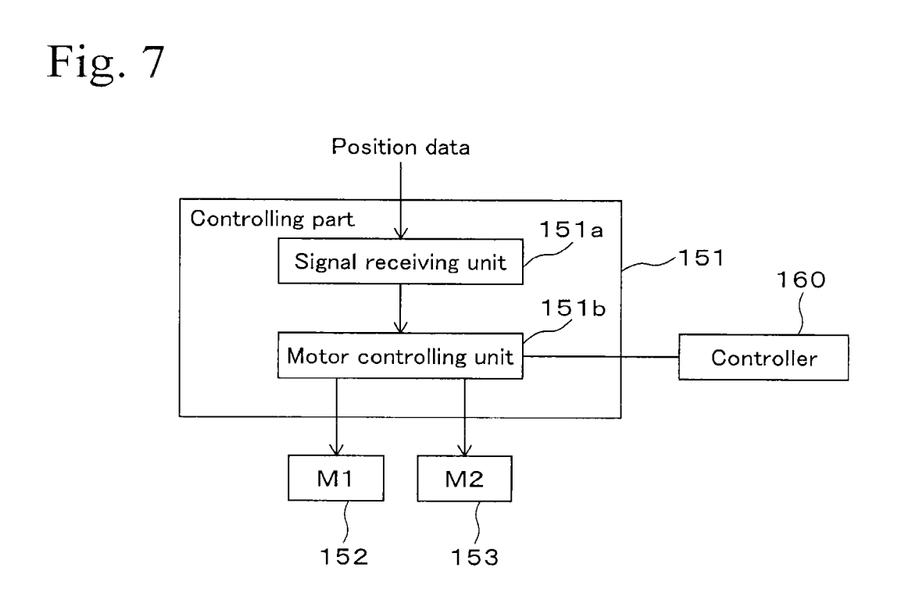
FIG. 7 is a block diagram of a controlling system of an embodiment.

FIG. 7 is a block diagram of a controlling system. FIG. 7 shows a controlling part 151, which is a computer for controlling the movements of the motors 152 and 153 and includes a CPU, a memory, and various interfaces. The controlling part 151 includes a signal receiving unit 151a and a motor controlling unit 151b as functioning units. Each of the functioning units may be constructed of a dedicated hardware or may be constructed by software.

The signal receiving unit 151a receives signals from the total station. The signals from the total station include location data of the survey setting point calculated by the total station. The signals may be transmitted through a wireless LAN. As for the communicating means, a wired communication or a wireless communication of another type may also be used.

The motor controlling unit 151b controls the movements of the motors 152 and 153 so that the irradiating point of the guiding light of the laser pointer 114 comes to the position (survey setting point) identified by the location data of the survey setting point, which is received by the signal receiving unit 151a from the total station. The motors 152 and 153 are stepping motors, and data of relationships between rotating number and rotating angle of each of the motors and the irradiating point (guiding position) of the guiding light are preliminarily obtained and are stored in a memory (not shown) provided at the controlling part 151. The motor controlling unit 151b makes the motors 152 and 153 rotate so that the survey setting point and the irradiating point of the guiding light coincide, based on the data relating to the survey setting point transmitted from the total station and based on the position of the reflective prism 113 (position of the movable part 112).

As shown in FIG. 5, a controller 160 having control buttons is arranged on a top surface of the box containing the controlling part 151. The worker can start the survey setting accessory 150, start a survey setting point searching mode (described later), and the like, by operating the controller 160. It should be noted that the controller 160 is omitted in FIGS. 6A and 6B.

Example of Working Procedure for Setting Survey Setting Point

Here, an example of a working procedure for marking a survey setting point located on a floor surface of a building will be described. A total station is set in a worksite, and a terminal and a survey setting accessory 150 are prepared, when starting the marking work. The set location of the total station is predetermined, and coordinates of the set location are preliminarily obtained. The terminal may be a portable information processing terminal, which can be used by a general operating system and is equipped with a communication function such as a wireless LAN, a display, and an operation input part such as a touch panel. The reflective prism 113 is positioned at a center within a movable range (the center of the opening 103).

First, coordinate data of a target survey setting point is transmitted from the total station to the terminal of the worker. This communication may be performed through a wireless LAN, for example. The location of the survey setting point is displayed on the display of the terminal of the worker by using the location of the total station as a reference. The worker moves the survey setting accessory 150 by hand while referring to this display. When the survey setting accessory 150 comes close to the survey setting point, the reflective prism 113 of the survey setting accessory 150 is acquired by the total station, and a distance measuring laser light is emitted to the reflective prism 113, whereby the location of the reflective prism 113 is measured by the total station.

The location data of the reflective prism 113 measured by the total station is transmitted to the terminal. When the terminal receives a signal of this location data, both the location of the survey setting point and the location of the reflective prism 113 measured by the total station are displayed on the display of the terminal. Then, the worker moves the survey setting accessory 150 so that the measured location of the reflective prism 113 on the display of the terminal comes close to the survey setting point.

The worker repeats a set of the measurement of the location of the reflective prism 113 and then the movement of the survey setting accessory 150 toward the survey setting point, until the survey setting point comes into the movable range of the reflective prism 113 of the survey setting accessory 150. The total station preliminarily obtains data relating to the movable range of the reflective prism 113 of the survey setting accessory 150, and it transmits a notification signal to the terminal based on this data when the survey setting point comes into the movable range of the reflective prism 113 of the survey setting accessory 150. The terminal informs the worker of receiving the notification signal by a notification sound, or by highlighting such as by blinking the display or the like, when it receives the notification signal.

When the worker is informed of the above notification, the worker starts the survey setting point searching mode by operating the controller 160 of the survey setting accessory 150 and shifts the mode thereto. The operation of instructing the start of the survey setting point searching mode may be performed by using the terminal, and the control signal may be transmitted from the terminal to the survey setting accessory 150, whereby the mode may be shifted to the survey setting point searching mode.

After the mode is shifted to the survey setting point searching mode, the controlling system is calibrated. In this calibration, a reference direction regarding a relationship between the rotation of each of the motors and the movement of the reflective prism 113 toward the survey setting point, and a relationship between the rotations of the motors and a moved distance of the reflective prism 113, are obtained. In this calibration, first, the motor 152 is slightly driven, and the movement of the movable part 112 is measured by the total station at this time. Then, the motor 153 is slightly driven, and the movement of the movable part 112 is measured by the total station at this time.

Since the location of the survey setting point is preliminarily set in the total station, the influence of the movement of each of the motors on the movement of the movable part 112 in a particular direction relative to the survey setting point is determined by the above measurements. For example, information such that the amount of moving distance of the movable part 112 in a particular direction relative to the survey setting point when the motor 152 is rotated in a specific rotating direction by X degrees, is obtained. By performing this calibration, a local coordinate system of the survey setting accessory 150 is defined, and coordinates of the survey setting point in the local coordinate system are determined.

Next, the motor controlling unit 151b performs a processing for rotating the motors 152 and 153 so that the location of the reflective prism 113 on a floor surface (position in a two-dimensional plane coordinate system) corresponds with the location of the survey setting point (or so that they have a relationship which can be judged as being corresponding), by using the results of the calibration.

Here, the above procedure may be repeated by measuring the location of the reflective prism 113 by the total station again, and the survey setting point searching mode may be executed again. Thus, the survey setting point searching mode is executed, and the reflective prism 113 is automatically moved to the location of the survey setting point.

The mode may be automatically shifted to the survey setting point searching mode when the survey setting point comes into the movable range of the reflective prism 113 of the survey setting accessory 150. In this case, the condition, in which the survey setting point comes into the movable range of the reflective prism 113 of the survey setting accessory 150, is judged by the controlling part 151 (or the total station), and the motor controlling unit 151b performs the calibration depending on the result of the judgment and then controls the movements of the motors 152 and 153 so that the measured location of the reflective prism 113 measured by the total station and the survey setting point coincide.

Advantages

The final step of the working procedure for setting the survey setting point is automatically performed, whereby the working efficiency is increased. In addition, since the calibration is performed, the survey setting point searching mode can be executed regardless of the direction of the survey setting accessory 150. If the calibration is not performed, the survey setting accessory 150 must be set by setting the direction thereof relative to the total station so that the rotations of the motors and the movement of the movable part 112 have a specific relationship. This working procedure is complicated and greatly decreases the working efficiency for marking the survey setting point, and the probability of increase in the margin of error is increased. Such problems are solved by performing the above calibration.

Others

In the structure shown in FIG. 3 or in FIGS. 4A and 4B, the movable part may be driven by motors. Also in this case, the survey setting point searching mode and the calibration therefor can be performed. For example, in the calibration in the case of the structure shown in FIGS. 4A and 4B, the pivot movements of the arms 131 and 132 are separately respectively performed, and the movement of the movable part 112 at this time is measured by the total station, whereby a local coordinate system of the survey setting accessory 140 is defined, and coordinates of the survey setting point in this local coordinate system are determined. The structure may be configured to emit the guiding light by setting the laser pointer 114 in the vertical upward direction. For example, this structure may be used for marking a survey setting point on a ceiling surface.

What is claimed is:

1. A surveying apparatus comprising a total station and a survey setting accessory including a reflective prism for searching for a survey setting point, wherein the total station is configured to emit a distance measuring laser light and measure a position of the reflective prism, the survey setting accessory comprising:
a leg part;
a base supported by the leg part and arranged with a first guide and a second guide, the first guide and the second guide crossing each other so as to be movable independently with each other relative to the base;
a movable part held by the base and being movable straight in any direction within a movable range in a two-dimensional plane relative to the base, the movable part engaging with the first guide and the second guide at a portion, at which the first guide and the second guide cross each other, so as to be simultaneously movable relative to the first guide and the second guide;
the reflective prism mounted on the movable part;
a laser pointer that is mounted to the movable part and that is configured to emit a guiding light in a vertical direction;
a first driving source configured to move the first guide relative to the base;
a second driving source configured to move the second guide relative to the base;
a motor controller configured to control movements of the first driving source and the second driving source; and
a signal receiver configured to receive a location data of the survey setting point from the total station,
wherein the motor controller is configured to execute a survey setting point searching mode so as to control the movements of the first driving source and the second driving source so that an irradiating point of the laser pointer coincides with the survey setting point that is indicated by the location data in response to the location data of the survey setting point that is received by the signal receiver from the total station,
the total station transmits a notification signal to a terminal used by a worker, and the terminal informs the reception of the notification signal when the survey setting point comes into the movable range of the reflective prism, and
the motor controller executes the survey setting point searching mode based on a command of the worker, and
in a beginning of the survey setting point searching mode, the motor controller executes a calibration to determine an orientation of the survey seting in which the movable part goes to the survey setting point, the calibration including first driving the first driving source in a first predetermined amount, measuring, by the total station, a first position of the movable part after the first driving, second driving the second driving source in a second predetermined amount, and measuring, by the total station, a second position of the movable part after the second driving.

2. The surveying apparatus according to claim 1, wherein the motor controller is further configured to:
determine the orientation in which the movable part goes to the survey setting point based on the first predetermined amount, the first position of the movable part, the second predetermined amount, and the second position of the movable part; and
control the first driving source and the second driving source to move the reflective prism to a position corresponding to the survey setting point based on the orientation of the survey setting accessory determined by the calibration.

3. A surveying apparatus comprising a total station and a survey setting accessory including a reflective prism for searching for a survey setting point, wherein the total station is configured to emit a distance measuring laser light and measure a position of the reflective prism, the survey setting accessory comprising:
a leg part;
a base supported by the leg part and arranged with a first guide and a second guide, the first guide and the second guide crossing each other so as to be movable independently with each other relative to the base;
a movable part held by the base and being movable straight in any direction within a movable range in a two-dimensional plane relative to the base, the movable part engaging with the first guide and the second guide at a portion, at which the first guide and the second guide cross each other, so as to be simultaneously movable relative to the first guide and the second guide;
the reflective prism mounted on the movable part;
a laser pointer that is mounted to the movable part and that is configured to emit a guiding light in a vertical direction;
a first driving source configured to move the first guide relative to the base;
a second driving source configured to move the second guide relative to the base;
a motor controller configured to control movements of the first driving source and the second driving source; and
a signal receiver configured to receive a location data of the survey setting point from the total station,
wherein the motor controller is configured to execute a survey setting point searching mode so as to control the movements of the first driving source and the second driving source so that an irradiating point of the laser pointer coincides with the survey setting point that is indicated by the location data in response to the location data of the survey setting point that is received by the signal receiver from the total station,
the total station transmits a notification signal to the motor controller when the survey setting point comes into the movable range of the reflective prism,
the motor controller that received the notification signal automatically executes the survey setting point searching mode, and
in a beginning of the survey setting point searching mode, the motor controller executes a calibration to determine an orientation in which the movable part goes to the survey setting point, the calibration including first driving the first driving source in a first predetermined amount, measuring, by the total station, a first position of the movable part after the first driving, second driving the second driving source in a second predetermined amount, and measuring, by the total station, a second position of the movable part after the second driving.

4. The surveying apparatus according to claim 3, wherein the motor controller is further configured to:
determine the orientation in which the movable part goes to the survey setting point based on the first predetermined amount, the first position of the movable part, the second predetermined amount, and the second position of the movable part; and control the first driving source and the second driving source to move the reflective prism to a position corresponding to the survey setting point based on the orientation of the survey setting accessory determined by the calibration.

\* \* \* \* \*